United States Patent [19]

Yasuda et al.

[11] Patent Number: 5,113,178
[45] Date of Patent: May 12, 1992

[54] POSITION DISPLAY APPARATUS

[75] Inventors: Tomio Yasuda, Saitama; Yuichi Murakami, Kanagawa, both of Japan

[73] Assignee: Aisin Seiki K.K., Aichi, Japan

[21] Appl. No.: 302,879

[22] Filed: Jan. 30, 1989

[30] Foreign Application Priority Data

| Jan. 29, 1988 | [JP] | Japan | 63-020247 |
| Jan. 29, 1988 | [JP] | Japan | 63-020248 |
| Jan. 29, 1988 | [JP] | Japan | 63-020249 |
| Jan. 29, 1988 | [JP] | Japan | 63-020250 |

[51] Int. Cl.$^5$ .................................. C08G 1/00
[52] U.S. Cl. .................................. 340/709; 340/706; 340/995; 340/815.31
[58] Field of Search ............... 340/990, 995, 706, 709, 340/795, 810, 815.31; 364/424.02, 449

[56] References Cited

U.S. PATENT DOCUMENTS

| 3,760,360 | 9/1973 | Reynolds et al. | 340/990 |
| 4,312,577 | 1/1982 | Fitzgerald | 340/995 |
| 4,513,377 | 4/1985 | Hasebe et al. | 340/995 |
| 4,631,678 | 12/1986 | Angermuller | 340/995 |

FOREIGN PATENT DOCUMENTS

| 0007413 | 1/1986 | Japan | 340/995 |
| 61-228486 | 3/1986 | Japan . |
| 61-110190 | 5/1986 | Japan . |

OTHER PUBLICATIONS

Foley, "Fundamentals of Interactive Computer Graphics", Addison-Wesley, 1984, pp. 222-224.

Primary Examiner—Alvin E. Oberley
Attorney, Agent, or Firm—Sughrue, Mion, Zinn, Macpeak & Seas

[57] ABSTRACT

A position display apparatus comprises a frame having a space for setting a map book; a memory for storing date on the map book; a position detector for detecting a position; a display provided on or in the vicinity of the frame; and a control means for selecting a page of the map book in accordance with map data stored in the memory and position information detected by the position detector, and for giving an instruction to the display to enable the display to display the data concerning the number of the selected page. The control gives an instruction to the display for displaying the number of the selected page. Alternatively, the control gives an instruction to the display for displaying coordinate data on the basis of the position detected by said position detector and the selected page.

10 Claims, 6 Drawing Sheets

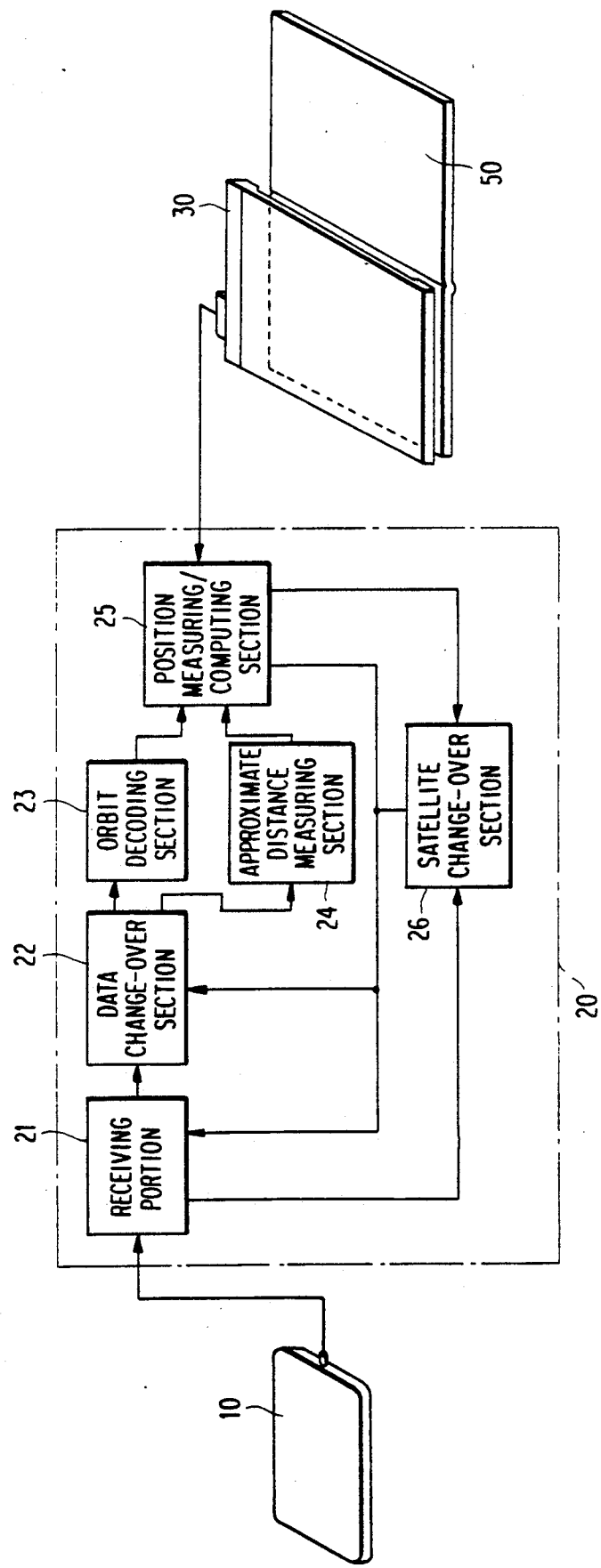

FIG. 7

| LONGITUDE / LATITUDE | 136°52'~137°00'30" | 137°00'~7'30" | 137°7'~15'30" | 137°15'~22'30" | 137°22'~30'30" | 137°30'~37'30" |
|---|---|---|---|---|---|---|
| 34°55'~35°00' | 0 | 0 | 0 | 0 | 0 | 0 |
| 35°00'~35°05' | 0 | 1 | 2 | 3 | 4 | 0 |
| 35°05'~35°10' | 0 | 5 | 6 | 7 | 8 | 0 |
| 35°10'~35°15' | 0 | 0 | 0 | 0 | 0 | 0 |

FIG. 8

| PAGE | POINT A LONGITUDE | POINT A LATITUDE | POINT B LONGITUDE | POINT B LATITUDE |
|---|---|---|---|---|
| 1 | 35°00' | 136°52'30" | 34°55' | 137°00' |
| 2 | 35°00' | 137°00' | 34°55' | 137°7'30" |
| 3 | 35°00' | 137°7'30" | 34°55' | 137°15' |
| 4 | 35°05' | 137°52'30" | 35°00' | 137°00' |
| 5 | 35°05' | 137°00' | 35°00' | 137°7'30" |
| 6 | 35°05' | 137°7'30" | 35°00' | 137°15' |
| 7 | 35°10 | 136°52'30" | 35°05' | 137°00' |
| 8 | 35°10' | 137°00' | 35°05' | 137°7'30" |

POSITION DISPLAY APPARATUS

BACKGROUND OF THE INVENTION

1. Field of the Invention

The present invention relates to a position display apparatus capable of displaying the position of a moving body such as an automobile, ship, aircraft and so forth, suitable for use as, for example, navigation system.

2. Description of the Prior Art

Apparatus for displaying position of a moving body has been known. For instance, Japanese Patent Laid-Open No. 61-75375 discloses a navigation apparatus for use on a vehicle, in which the instant position of the vehicle is computed on the basis of the running distance and direction and is displayed together with map information read from a memory on a display means such as a CRT or an LCD.

Japanese Utility Model Laid-Open No. 56-12300 discloses a moving body position display apparatus in which the instant position is displayed on a matrix display and a map is placed under the matrix display so that the position of the moving body is indicated in relation to the map. According to this arrangement, the magnification of display and the area of display can be altered in accordance with the map so as to enable the use of a plurality of maps. The matrix display is made of a transparent tabular member and is provided with a multiplicity of horizontal and vertical electrodes. When signals are applied to selected vertical and horizontal electrodes, the point of intersection lights up, generates a color or turned opaque. Thus, a plasma display or a liquid crystal display are typically used.

The art of the type disclosed in Japanese Patent Laid-Open No. 61-75375 requires a memory device of a large storage capacity in order to store voluminous map data such as roads, names of streets and towns, addresses and so forth. Thus, there is a practical limit in the number of the maps usable in this system, due to the limit in the storage capacity of the memory device.

On the other hand, the art disclosed in Japanese Utility Model Laid-Open No. 56-12300 requires frequent change of magnification and display area when different maps are used. Therefore, a map having a small resolution has to be used particularly when the vehicle travels a long distance. Conversely, frequent change of map is necessary when a high resolution if required. This necessitates a complicated and troublesome data input operation which involves a large risk of mis-operation.

Accordingly, an object of the present invention is to provide a position display apparatus which is capable of displaying the position of a body carrying the apparatus or the position of an object without requiring the capacity of the memory means to be increased, and which enables an easy set-up of a map in a map book upon replacement of the map book.

Commercially sold map books are usually colored, e.g., in three colors. When such a colored map is used in combination with the display apparatus which utilizes lighting, color generation or opaqueness at the point of intersection of electrodes as in the matrix display shown in Japanese Utility Model Laid-Open No. 56-12300, a problem is caused in that the recognition of the indicated point may be hindered due to similarity of color between the indicated point and the map.

Accordingly, another object of the present invention is to provide a position display apparatus which enables an easy recognition of the position of the body carrying the apparatus or the position of an object.

The apparatus disclosed in Japanese Utility Model Laid-Open No. 56-12300 also encounters a problem in that, since no means is available for informing any deviation of the indication from the correct position due to, for example, a failure in the apparatus, the user may rely upon wrong information.

Accordingly, a further object of the present invention is to provide a position display apparatus which is capable of enabling the user to confirm the coordinates of the measured position, in addition to the recognition of the position information on a map.

A further object of the present invention is to provide a position display apparatus which prevents any erroneous information from being given to the user in the event of a failure in detection of the position.

SUMMARY OF THE INVENTION

According to the present invention, there is provided a position display apparatus comprising: a frame having a space for setting a map book; memory means for storing data on the map book; position detecting means for detecting a position; display means provided on or in the vicinity of the frame; and control means for selecting a page of the map book in accordance with map data stored in the memory means and position information detected by the position detecting means, and for giving an instruction to the display means to enable the display means to display the data concerning number of the selected page.

The control means gives an instruction to the display means for displaying the number of the selected page. Alternatively, the control means gives an instruction to the display means for displaying coordinate data on the basis of the position detected by said position detecting means and the selected page.

According to this arrangement, the controller selects a specific page of a map book in accordance with the map data stored in the memory means and the position information derived from the position detection means. The display means displays the number of the selected page or the coordinates.

These and other objects, features and advantages of the present invention will become clear from the following description of the preferred embodiments when the same is read in conjunction with the accompanying drawings.

BRIEF DESCRIPTION OF THE DRAWINGS

FIG. 1 is a schematic block diagram of a navigation apparatus embodying the present invention;

FIG. 5 is a circuit diagram of the control circuit shown in FIG. 2a;

FIG. 7 is an illustration of an optimum page number table stored in an external ROM; and FIG. 8 is a table showing coordinates of points A and B which are the points of origin and maximum coordinate points in the respective pages of the map book stored in the external ROM of FIG. 5.

DESCRIPTION OF THE PREFERRED EMBODIMENTS

Figure 2B:
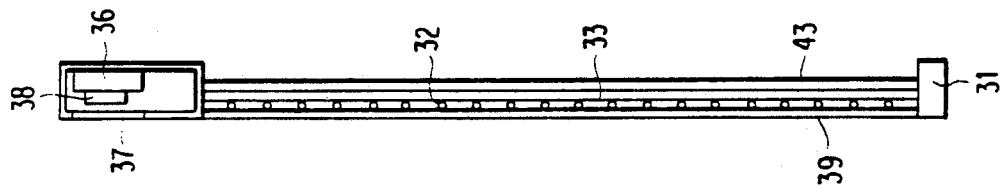
FIGS. 2a and 2b are a plan view and a sectional view of the navigation apparatus shown in FIG. 1.

An embodiment of the present invention applied to a navigation system on a moving body will be described hereinafter with reference to the accompanying drawings. Referring to FIG. 1, the embodiment has an antenna 10, a GPS receiver 20, a display device 30 and a map book 50. The GPS is a known device which measures its position by making use of electric waves from three or four satelites. The GPS receiver 20 has a receiving portion 21, a data change-over section 22, an orbit decoding section 23, an approximate distance measuring section 24, a position measuring/computing section 25, and a satellite change-over section 26. A signal received by the receiving section 21 through the antenna 10 is processed so that orbit data and approximate distance data are separated. These data are delivered to the position measuring/computing section 25. The position measuring/computing section 25 computes the values longitude and latitude of its position and delivers the same to the display section 30. Thus, the antenna and the GPS receiver constitute position detection means which detects the instant position.

Figure 2A:
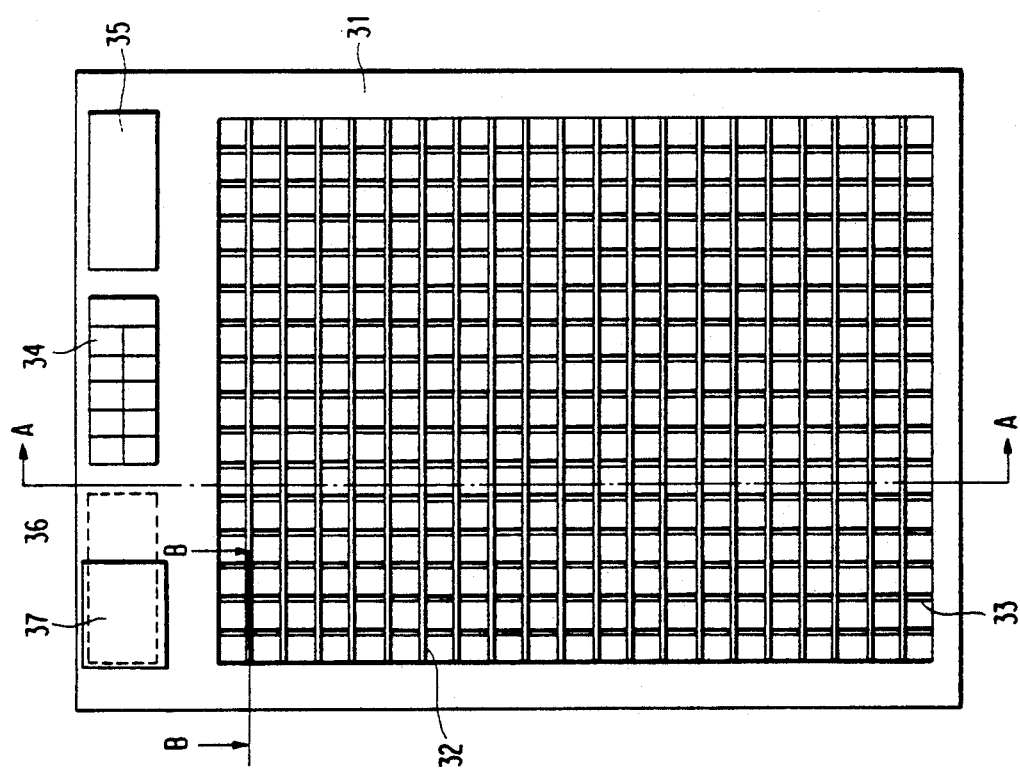

FIGS. 2a and 2b show an example of the display device 30. The display device 30 has a frame 31, groups 32,33 of transparent optical fibers, a group 34 of input keys, and a letter display section or means 35. The frame 31 incorporates a control circuit 36. An external ROM serving as the memory means is detachably connected to the control circuit 36. The external ROM 38 becomes accessible when a lid 37 on the frame 31 is opened for free replacement. As will be explained later, the external ROM stores various data such as the page number of a preselected map book, coordinates of the origin points of the respective pages, and so on. The apparatus of the invention thus enables the use of a plurality of external ROMs 38. If each ROM stores the data of a map book, the map book is changed each time the ROM is replaced. This, however, is not exclusive and each ROM may contain data of two or more map books provided that the capacity of the ROM is large enough to store such abundant data. Any recording medium which enables recording and reproduction of information can be used as the external ROM 38. Examples of such external ROMs are optical disks, magnetic disks, magnetic tapes, ICs, IC cards, memory cards, paper tapes, bar codes, and so on.

Figure 3A:
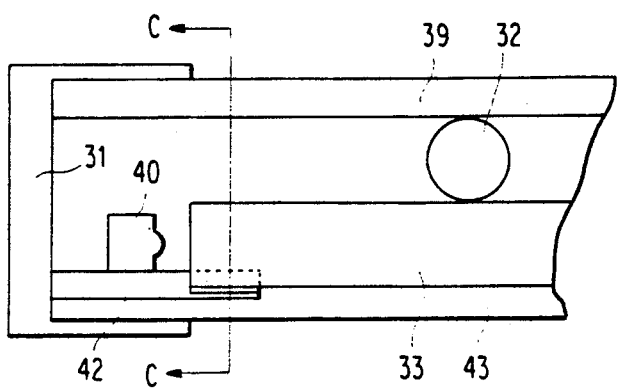
FIGS. 3a and 3b are partial sectional views of the display apparatus shown in FIGS. 3a and 3b.
Figure 3B:
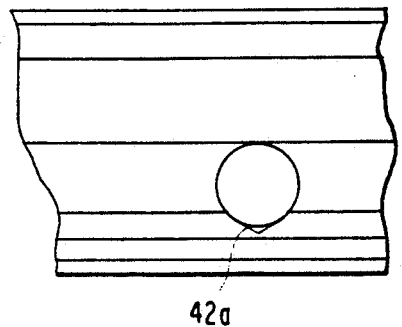

The optical fiber groups 32 and 34 are arranged in a lattice or grid-like form on the frame 31 such that they orthogonally cross each other. There are two groups of light-emitting diodes 40 and 41. Light-emitting diodes of the respective groups are arranged on one ends of the optical fibers of the respective optical fiber groups 32 and 33, as will be seen from FIG. 3a. As will be seen from FIGS. 3a and 3b, the light-emitting diode groups 40 and 41 are mounted on a substrate 42 which is disposed in the frame 31. The substrate 42 is provided with V-notched 42a which are used for aligning the optical fibers of the groups 32 and 33, thereby fixing these optical fibers. In order to protect the optical fibers of the groups 32 and 33, a pair of transparent plates 39 and 43 are disposed on the frame 31 in such a manner as to sandwich the optical fiber groups 32 and 33 from the upper and lower sides thereof.

Figure 4:
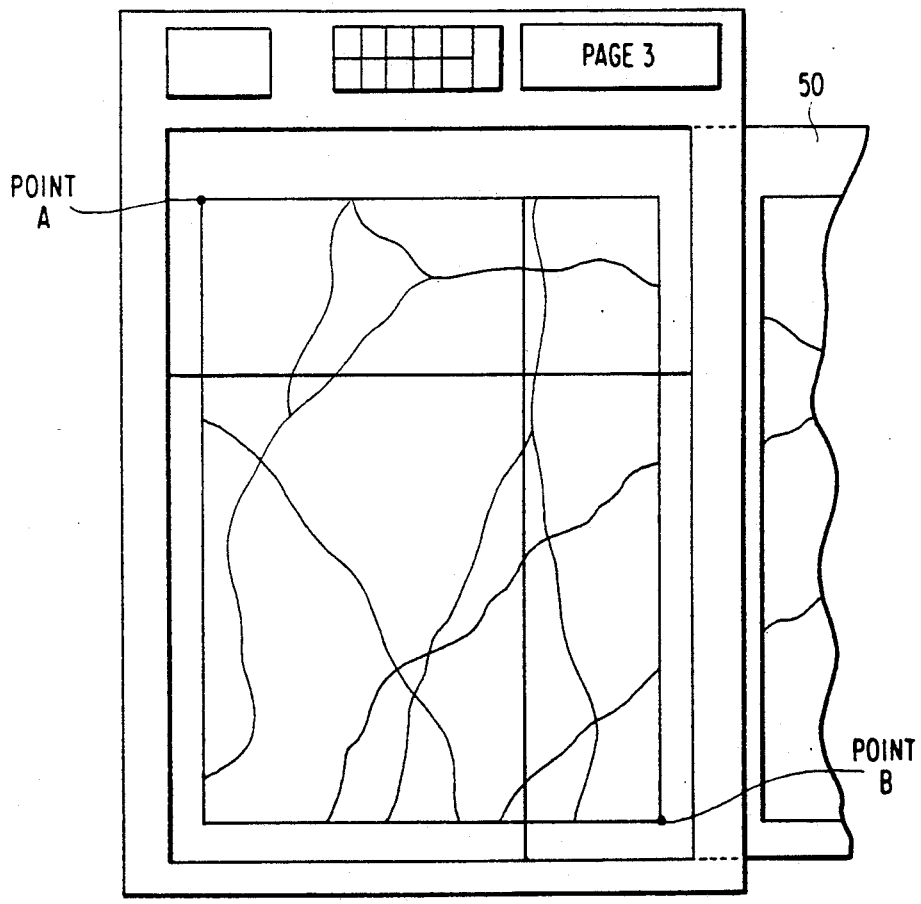
FIG. 4 is an illustration of the manner in which the display apparatus of FIG. 2a is used.

The clad of each optical fiber of the groups 32 and 33 is partly roughened so as to cause a random reflection of the light thereby to illuminate. Therefore, when one of the light-emitting diodes of each of the groups 40 and 41 is activated, a cross-like illumination is formed by two orthogonal optical fibers as will be seen from FIG. 4.

Figure 5:
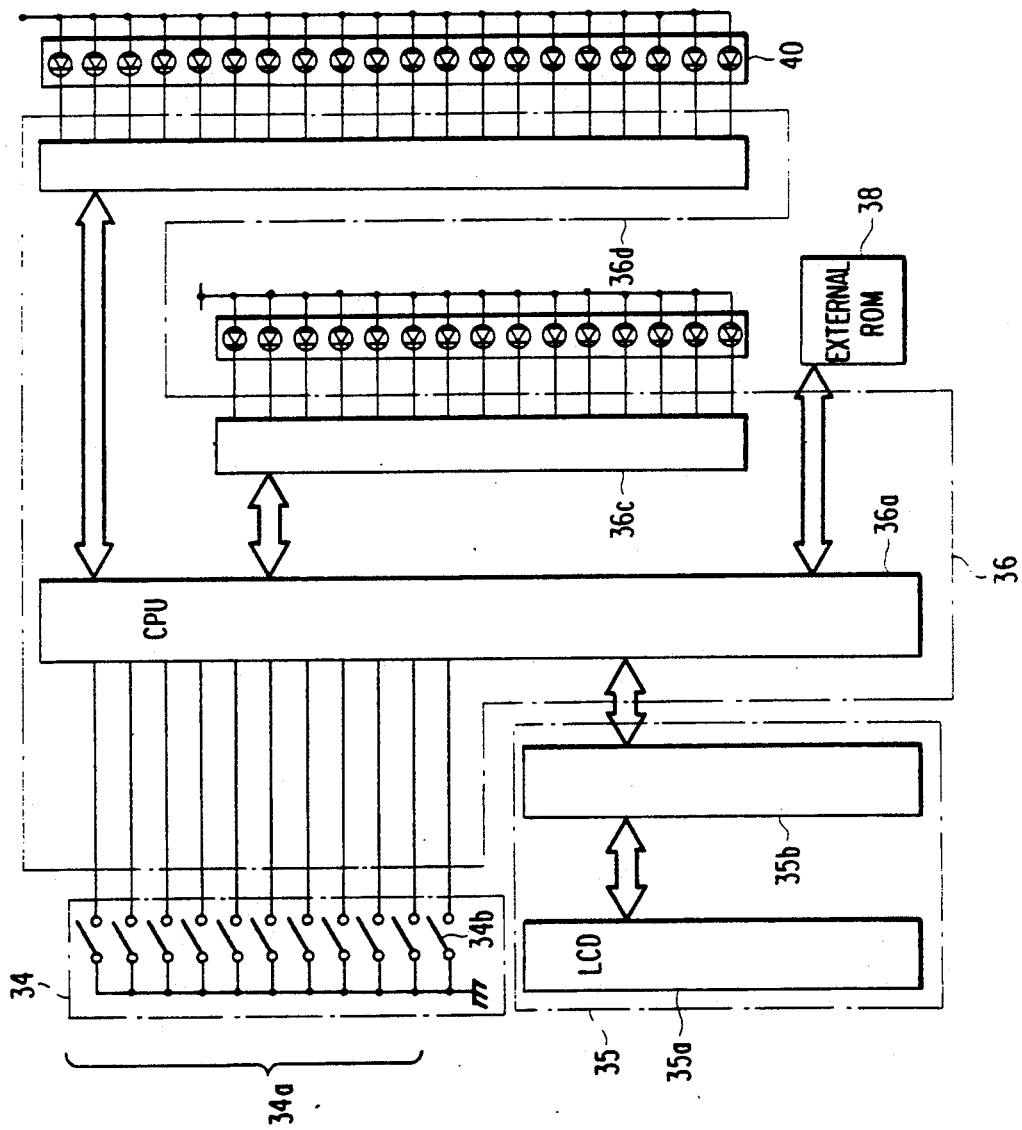

The input key group 34, character display section 35, light-emitting diode groups 40 and 41, external ROM 38 and the control circuit 36 are connected by a circuit as shown in FIG. 5. The input key group 34 is composed of a ten-key device 34a and setting keys 34b. The character display section 35 is composed of an LCD (liquid crystal display) 35a and an LCD control circuit 35b. The LCD control circuit 35b controls the LCD 35a so as to enable it to display alphanumeric characters, kanji, and so forth in accordance with signals derived from the control circuit 6.

The control circuit 36 includes a CPU 36a which is a microcomputer, and a known LED driving circuits 36b and 36c for driving the light-emitting diodes of the diode groups 40 and 41. The CPU 36a operates in accordance with a flow which is shown by a flow chart in FIG. 6.

Figure 6:
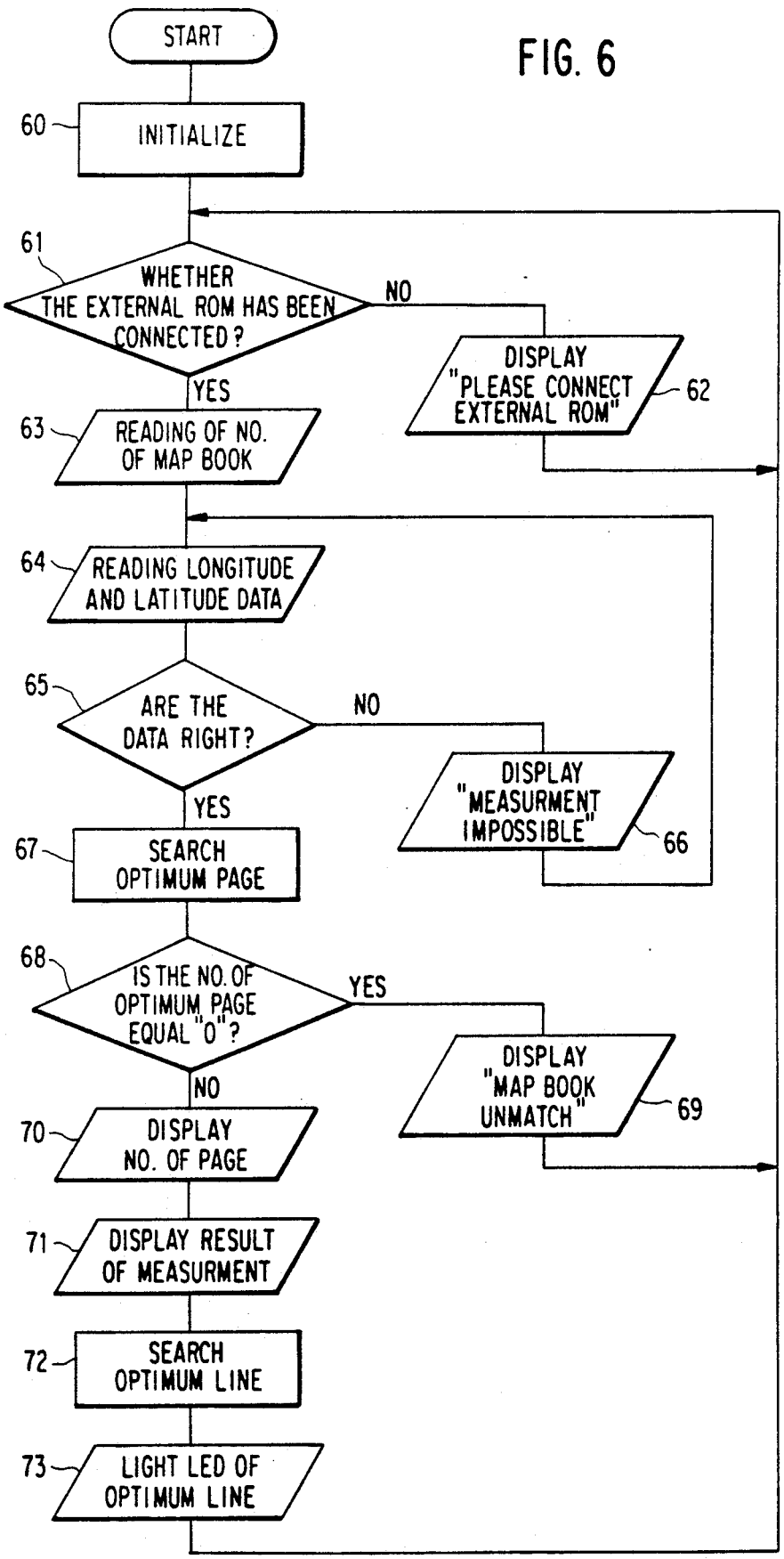
FIG. 6 is a flow chart of the control circuit shown in FIG. 5.

The operation of the CPU 36a will be explained with reference to FIG. 6. As the CPU 36a starts to operate, the internal memory of the CPU 36a and the input/output ports are initialized in Step 60. Judgment as to whether the external ROM 38 has been connected or not is conducted in Steps 60 and 61. When no ROM 38 is connected, the CPU 36a gives instructions to the display section 35 to enable the latter to display a message reading "PLEASE CONNECT EXTERNAL ROM".

In Step 63, the No. of the map book is read from the external ROM 38 and then the longitude and latitude of the instant position of the apparatus is read from the data derived from the GPS receiver 20. When the reading of the longitude and latitude is failed due to, for example, impossibility of receipt of waves from three satelites as in the case where the GPS receiver is hidden by, for example, a building, an alarming message such as "MEASUREMENT IMPOSSIBLE" is displayed on the display section 35. Then, the GPS again conducts reading of latitude and longitude. These operations are performed in Steps 64, 65 and 66.

Then, after a retrieval of the latitude and longitude, the CPU retrieves the page index to find the optimum page (Step 67). The external ROM 38 stores an optimum page table as shown in FIG. 7. The table shows page numbers optimum for various combinations of latitude and longitude. Thus, the optimum page is read from the optimum page number table, in accordance with the values of latitude and longitude detected by the GPS receiver 20. In some cases, the position determined by the detected latitude and longitude may not be covered by the pages in the presently used map book. In such a case, the number of optimum page is indicated by "0". If the optimum page number "0" is obtained after the retrieval of the optimum page table, an instruction is given to the character display section 35 to make it display a message reading "map book unmatch", and then the process returns to Step 61. If the optimum page number is other than "0", the optimum page number is displayed on the display section 35.

After displaying the optimum page number on the character display section for several seconds, the CPU operates to enable the character display section 35 to display the instant latitude and longitude read by the GPS receiver 20.

In Step 72, a retrieval for detection of optimum lines is executed so as to determine which optical fiber is to be illuminated in each of the optical fiber groups 32 and 33. The external ROM 38 also stores a table shown in FIG. 8. This table contains coordinate values of points A and B which are the point of origin and maximum coordinate points of the respective pages. Thus, the optimum lines are determined by checking up this table with the instant latitude and longitude values read from the data delivered by the GPS receiver 20.

An example of the method for determining the optimum lines will be described. The coordinates of the point A and point B are represented, respectively, by (Ax, Ay) and (Bx, By), while the coordinates of the apparatus itself is shown by (X, Y).

In such a case, the latitude is given by rounding a value which is determined by $(Ax-X)/(Ax-Bx)\times(I+1)$, while the longitude is given by rounding the value determined by $(Ay-Y)/(Ay-By)\times(J+1)$, where I represents the number of the optical fibers of the optical fiber group 32 corresponding to longitude lines, while J represents the number of the optical fibers of the optical fiber group 33 corresponding to the latitude lines. The control is then executed to deliver signals to the LED driving circuits 36b and 36c in such a manner as to activate the light-emitting diodes corresponding to the thus determined optimum lines. The above-described method of determining the optimum lines is only illustrative. For instance, the determination of the optimum lines maybe executed by storing, in place of the coordinate data of the maximum coordinate point B, the scales of the respective pages and using the data concerning the scales in place of the coordinate data of the point B.

In use of the navigation system, the user starts the system while preparing a desired map book. The user then opens the map book at the page the number of which is indicated on the character display section of the system.

The input keys of the input key group 34 enable the user to input the type of the map book selected from a plurality of types of map books usable on the system.

As will be understood from the foregoing description, the present invention offers the following advantages.

Once a map book is appointed by the user, the apparatus of the present invention automatically appoints the number of the page at which the map book is to be opened, and the position is displayed on the basis of this page. The user, therefore, is required only to open the map book at this page and set the map book in the display apparatus.

The memory means stores various data concerning the map book such as the number of pages in the map book, coordinates of the points of origin of the respective pages, scales, and so forth. Therefore, it is not necessary to newly input such data when the map is changed in the map book, so that the operation is facilitated. Since the memory means is not required to store voluminous data such as roads, crossings, names of streets and towns, the storage capacity of the memory means can be reduced. The same storage capacity is enough for each of different map books. Therefore, the position display apparatus of the present invention has a wide adaptability to cover wide areas and districts which are shown on the commercially available map books.

In addition, when the detected position is out of the areas of maps in the map book under the use, the apparatus indicates that the map book is to be changed. The position is then displayed on a suitable map of the new map book.

Furthermore, the memory means can easily be detached from the position display apparatus and it is possible to prepare a plurality of memory means corresponding to different map books. If a memory corresponding to a map book is prepared by the manufacturer of the map book concurrently with the edition of the map book, users are relieved from troublesome work for setting data of the map book in the memory means, by using such a memory together with the map book.

The construction of the display section can be simplified by the use of optical fibers as in the illustrated embodiment. In addition, the position can be distinctively indicated as the point of crossing of two lines rather than by a mere spot.

Furthermore, the user can decisively understand the instant position by using the coordinate data displayed on the frame of the display apparatus in combination with the display on the map. The simultaneous display of the position on the map and the display of coordinates on the map enables the user to find any mal-function or error in the position display function or the coordinate display function, as well as which of these functions is in trouble.

When the position detection means is unable to detect the position, a warning is displayed on the character display means provided on the frame, thus avoiding inconveniences such as reliance on wrong position information.

What is claimed is:

1. A position display apparatus comprising:
a frame having a space for setting a map book;
memory means for storing data on said map book;
position detecting means for detecting a position;
display means provided on said frame; and
control means for selecting a page of said map book in accordance with map data stored in said memory means and position information detected by said position detecting means, and for giving an instruction to said display means to enable said display means to display the data concerning number of the selected page;
wherein said display means includes character display means capable of displaying a map book changing instruction, said control means being capable of judging, on the basis of the position information detected by said position detecting means and the data stored in said memory means, whether the detected position is covered by the maps in said map book and, upon judging that the detected position is not covered by said maps, giving an instruction to said character display means to enable said character display means to display said map book changing instruction,
wherein said display means includes a first group of optical fibers arranged in said frame in the longitudinal direction, a second group of optical fibers arranged in said frame transversely so as to orthogonally cross said optical fibers of said first group, and first and second groups of light-emitting diodes mounted on said frame adjacent respective ends of said first and second groups of optical fibers.

2. A position display apparatus according to claim 1, wherein said memory means is demountable from said position display apparatus.

3. A position display apparatus according to claim 2, wherein said memory means includes a plurality of storage means each of which can store data concerning at least one map book.

4. A position display apparatus according to claim 1, wherein said display means is capable of displaying a warning information, and said control means is capable of giving an instruction to said display means to enable said display means to display said warning instruction when said position detecting means is unable to detect the position.

5. A position display apparatus comprising:
a frame having a space for setting a map book;
memory means for storing data on said map book;
position detecting means for detecting a position;
display means provided on said frame; and
control means for selecting a page of said map book in accordance with map data stored in said memory means and position information detected by said position detecting means, and for giving an instruction to said display means to enable said display means to display coordinate data of said position on the basis of the position detected by said position detecting means and the selected page;
wherein said display means includes a first group of optical fibers arranged in said frame in the longitudinal direction, a second group of optical fibers arranged in said frame transversely so as to orthogonally cross said optical fibers of said first group, and first and second groups of light-emitting diodes mounted on said frame adjacent respective ends of said first and second groups of optical fibers.

6. A position display apparatus according to claim 5, wherein said display means includes a character display means capable of displaying characters, and wherein said control means gives an instruction to said display means to enable said display means to display the coordinate values of the position detected by said position detecting means.

7. A position display apparatus according to claim 5, wherein said display means includes a character display means capable of displaying a map book changing instruction, said control means being capable of judging, on the basis of the position information detected by said position detecting means and the data stored in said memory means, whether the detected position is covered by the maps in said map book and, upon judging that the detected position is not covered by said maps, giving an instruction to said character display means to enable said character display means to display said map book changing instruction.

8. A position display apparatus according to claim 5, wherein said memory means is demountable from said position display apparatus.

9. A position display apparatus according to claim 8, wherein said memory means includes a plurality of storage means each of which can store data concerning at least one map book.

10. A position display apparatus according to claim 5, wherein said display means is capable of displaying a warning information, and said control means is capable of giving an instruction to said display means to enable said display means to display said warning instruction when said position detecting means is unable to detect the position.

* * * * *